United States Patent
Andreatta et al.

(10) Patent No.: US 12,540,403 B2
(45) Date of Patent: Feb. 3, 2026

(54) STABLE COMPOSITION FOR CATALYTIC DEPOSITION OF SILVER

(71) Applicant: SWISSto12 SA, Renens (CH)

(72) Inventors: Gaëlle Andreatta, Neuchâtel (CH); Alba Finelli, Fribourg (CH)

(73) Assignee: SWISSto12 SA, Renens (CH)

( * ) Notice: Subject to any disclaimer, the term of this patent is extended or adjusted under 35 U.S.C. 154(b) by 0 days.

(21) Appl. No.: 18/263,241

(22) PCT Filed: Jan. 24, 2022

(86) PCT No.: PCT/IB2022/050577
§ 371 (c)(1),
(2) Date: Jul. 27, 2023

(87) PCT Pub. No.: WO2022/162512
PCT Pub. Date: Aug. 4, 2022

(65) Prior Publication Data
US 2024/0301558 A1    Sep. 12, 2024

(30) Foreign Application Priority Data
Jan. 28, 2021  (FR) ........................ 2100838

(51) Int. Cl.
*C23C 18/44*    (2006.01)
(52) U.S. Cl.
CPC ................... *C23C 18/44* (2013.01)
(58) Field of Classification Search
None
See application file for complete search history.

(56) References Cited

U.S. PATENT DOCUMENTS

| | | | | |
|---|---|---|---|---|
| 3,617,363 | A * | 11/1971 | Metzger | C23C 18/1662 106/1.23 |
| 5,645,628 | A | 7/1997 | Endo et al. | |
| 2004/0043153 | A1* | 3/2004 | Okuhama | C23C 18/28 427/430.1 |
| 2008/0038449 | A1 | 2/2008 | Poole et al. | |

(Continued)

FOREIGN PATENT DOCUMENTS

| | | |
|---|---|---|
| EP | 2975159 A1 | 1/2016 |
| JP | S6115986 A | 1/1986 |

(Continued)

OTHER PUBLICATIONS

International Search Report for PCT/IB2022/050577 dated Apr. 21, 2022.

(Continued)

*Primary Examiner* — Alexander M Weddle
(74) *Attorney, Agent, or Firm* — McDonald Hopkins LLC

(57) ABSTRACT

A solution including at least one metal salt, a reducing agent which makes it possible to reduce the metal salt, and a stabilising additive of formula F1 in which the Ra, Rb and Rc groups denote, independently of one another, an alkane, an alkene or an alkyne, which may be independently linear, branched or cyclic and which include from 1 to 20 carbon atoms, and where the Rd and Re groups denote, independently of one another, a hydrogen atom, or an alkane, an alkene or an alkyne, which may each be independently linear, branched or cyclic and which include from 1 to 20 carbon atoms.

11 Claims, 1 Drawing Sheet

(56) References Cited

U.S. PATENT DOCUMENTS

| | | | | |
|---|---|---|---|---|
| 2008/0206474 A1* | 8/2008 | Remgard | ............ | C23C 18/1651 |
| | | | | 106/1.19 |
| 2008/0206488 A1* | 8/2008 | Chung | .................... | C09D 5/24 |
| | | | | 252/514 |
| 2012/0145555 A1* | 6/2012 | Rzeznik | .............. | C23C 18/2086 |
| | | | | 205/187 |
| 2016/0168715 A1 | 6/2016 | Ma et al. | | |

FOREIGN PATENT DOCUMENTS

| | | |
|---|---|---|
| JP | H0497912 A | 3/1992 |
| JP | H0883796 A | 3/1996 |
| JP | 2000265280 A | 9/2000 |
| JP | 2000355774 A | 12/2000 |
| JP | 2003268558 A | 9/2003 |
| JP | 2010118334 A | 5/2010 |
| JP | 2013095956 A | 5/2013 |
| JP | 2014013660 A | 1/2014 |
| JP | 2019537820 A | 12/2019 |
| KR | 20120003259 A | 1/2012 |

OTHER PUBLICATIONS

Written Opinion for PCT/IB2022/050577 dated Apr. 21, 2022.
Office action in corresponding JP Application No. 2023-545755, dated Oct. 30, 2024.
"Capstone™ FS-50 Fluorosurfactant," Safety Data Sheet, Chemours, Jan. 8, 2024.

* cited by examiner

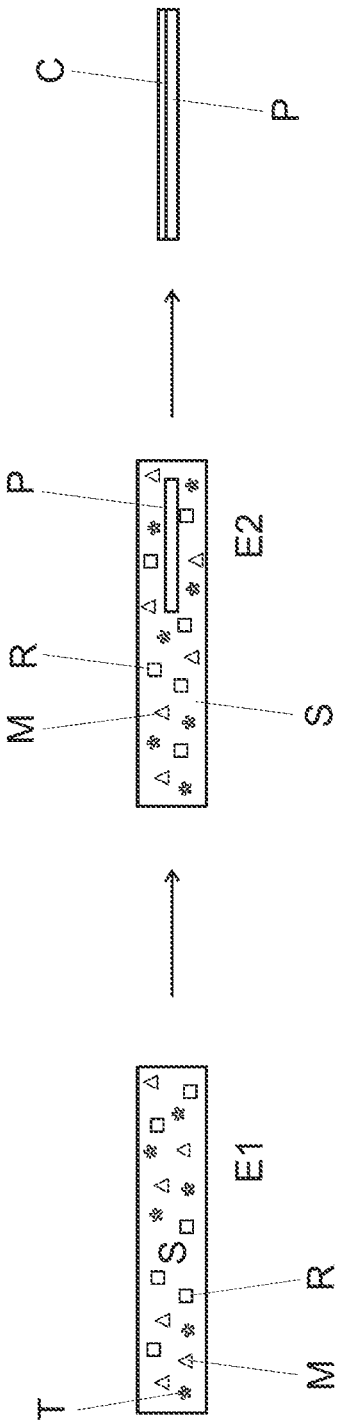

STABLE COMPOSITION FOR CATALYTIC DEPOSITION OF SILVER

TECHNICAL FIELD

The present invention relates to a composition for deposition of metals, in particular of silver or of copper, by a method that is non-electrolytic and non-electrochemical. The present invention relates in particular to stable compositions comprising a metal in solution, a reducing agent and one or more additives, for stabilizing the composition. The present invention also covers a method of metal deposition, in particular a method of depositing silver in non-electrolytic conditions.

PRIOR ART

Non-electrolytic metal deposition is commonly used for metal coating of surfaces, in various applications comprising decoration of surfaces, optical uses, application of an electrically-conducting layer, a priming coat between a surface and a final coating, or an over-coating such as those applied in the fabrication of printed circuits.

Non-electrolytic metal deposition is carried out starting from one or more metal salts held in solution and at least one suitable reducing agent for reducing the metal salt or salts in solution. A metallized layer thus appears on the surfaces to be coated. This is exclusively chemical deposition, involving neither electric current nor electrodes. In practice, an autocatalytic bath is prepared in advance and is used for chemical deposition on several items immersed successively in the autocatalytic bath.

One of the limitations of this method is the stability of the autocatalytic bath, in particular with respect to maintaining in solution the metal salts used, which may be liable to unsuitable precipitation or congealing. Furthermore, the chemical reactions allowing metallization of the surfaces should as far as possible take place at the level of the surfaces to be coated. In some cases the reduction reactions take place in the solution, thus consuming a substantial proportion of the metal salt needlessly.

These limitations are particularly pronounced in the case of silver solutions. In practice, baths of silver are prepared from two separate baths, one comprising the silver salt and the other the reducing agent. The two solutions are combined at the time of deposition. They are preferably sprayed simultaneously on the surface to be coated, so that the chemical reaction occurs mainly on the surface. However, this method of chemical coating gives silver coatings of low quality, in particular with respect to their roughness or homogeneity. Furthermore, the thickness of such a coating is generally less than a micrometer.

When a silver bath is prepared in advance, additives such as complexing agents, surfactants or other stabilizing elements are added to maintain its stability. This is the case in particular when using cobalt salts as reducing agent of the silver salts. In this case, the bath can be stabilized for several hours in quite specific conditions. It should be noted that the additives must be specifically adapted to the reducing agent and to optional other constituents of the solution.

It is consequently necessary to develop compositions for chemical deposition based on metal salts, in particular based on silver salts, which are stable and which make it possible to control the quality of the deposits better.

SUMMARY OF THE INVENTION

One aim of the present invention is to propose a composition for metal deposition, in particular of silver or of copper, on surfaces in non-electrolytic and non-electrochemical conditions. The aim is in this case to supply solutions for chemical deposition that are stable over time, for at least several days. The aim is also to propose solutions for chemical deposition, and in particular of silver, which give uniform deposits with thicknesses greater than a micrometer, or even from more than 5 to more than 10 micrometers.

Another aim of the present invention is to propose a method suitable for metal deposition, in particular of silver or of copper, in non-electrolytic and non-electrochemical conditions, which are less expensive than the known methods. A further aim of the proposed method is to give metal deposits of better quality than those currently obtained, in particular with silver salts.

These objectives are achieved in particular owing to the solutions and the method described in the independent claims and detailed in the claims that are dependent thereon.

BRIEF DESCRIPTION OF THE FIGURES

The invention is described with the aid of the following FIGURES:

FIG. 1: Schematic view of the main steps of the method according to the present invention.

DETAILED DESCRIPTION OF THE INVENTION

The solutions S according to the present invention contain at least one metal salt M in solution intended to be deposited on a surface P to be coated with a metallic layer C. The metal salts M include in particular the combination of inorganic anions with the metal cation. These inorganic anions are preferably selected from sulfates, nitrates, phosphates and halides. Organic salts may optionally be envisaged such as acetates. The solutions S according to the present invention preferably comprise metal salts M based on nitrate.

The metal that is a constituent of the metal salt M may be selected from several elements such as copper, platinum, silver, gold and other metals, depending on the applications and the properties required. Preferably, the metal salts M of the solutions prepared according to the present invention are based on silver or copper, more preferably based on silver. The metal salts such as silver nitrate $AgNO_3$, silver sulfate $Ag_2SO_4$, copper nitrate $Cu(NO_3)_2$ and copper sulfate $CuSO_4$ are advantageously used in the present solutions S.

The concentration of the metal salts M is preferably between 0.01 mole/liter and 0.5 mole/liter, preferably between 0.03 mole/liter and 0.1 mole/liter.

The solution S according to the present invention comprises at least one reducing agent R. The reducing agent is a metal salt selected as a function of its redox potential so as to be able to reduce the metal salt M in solution. The reducing element comprises in this case an inorganic anion selected from sulfates, nitrates, phosphates and halides. In the case when the metal salt M to be deposited is based on silver, the reducing agent R may for example be based on cobalt. Advantageously, the reducing agent R is a hydrated cobalt sulfate, such as $CoSO_4 \cdot 7H_2O$.

The concentration of the reducing agent R is preferably greater than that of the metal salt M. It may be of the order of about 2 to 10 times that of the metal salt M. The concentration of the reducing agent R may be for example between 0.04 mole/liter and 1 mole/liter, or between about 0.08 mole/liter and 0.2 mole/liter.

The solutions S according to the present invention may comprise one or more other nonmetal salts such as sulfates or nitrates. In particular, they may contain ammonium sulfate $SO_4(NH_4)_2$ in variable concentrations between 0.1 mole/liter and 2 mole/liter.

The solutions S according to the present invention may further comprise aqueous ammonia $NH_3$, in variable concentrations between about 1 mole/liter and 5 moles/liters.

The solutions according to the present invention may further comprise one or more amino acids. If applicable, the solutions according to the present invention comprise one or more alpha amino acids. The amino acid or acids may be selected from the natural amino acids known by a person skilled in the art. Alternatively or in addition, the amino acid or acids may be mono-, di- or trisubstituted with substituents selected from halogens, amino groups, alcohol, thiols or nitro.

According to an advantageous embodiment, the solution according to the present invention comprises diiodotyrosine of the following formula:

[Chem 1]

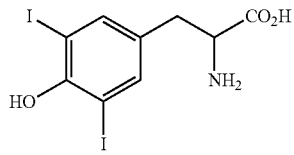

The total concentration of the amino acid or acids in the solution may be between about $1\ 10^{-6}$ and $1\ 10^{-4}$ moles per liter. It is preferably of the order of 1 to $8\ 10^{-5}$ mole per liter.

The solutions S are essentially aqueous, which means that the elements in solution are dissolved in water. This does not exclude adding a small proportion of an organic solvent. Said organic solvents include for example ethanol, methanol, or other more polar or less polar solvents.

A stabilizer T according to the present description is preferably selected from zwitterionic organic compounds, comprising two opposite charges. The zwitterionic compounds are known by a person skilled in the art to comprise a negative charge and a positive charge at the same time. Said zwitterionic compound preferably comprises a polar part uniting the two opposite charges, and a nonpolar part, so that it has amphiphilic properties. The zwitterionic compounds used in the present invention therefore have surfactant properties. These properties are not sufficient, however, to stabilize the solutions S of the present invention. It is in fact found that the surfactants of anionic or cationic type do not produce the expected effects. The neutral surfactants, without ionic charges, are also judged unsatisfactory overall in the case of the present solutions.

The stabilizers T according to the present description are zwitterionic surfactants. The polar part, comprising the two opposite charges, is preferably of the betaine type, whose structure corresponds to the following formula F0:

[Chem 2]

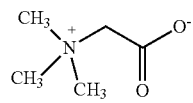

F0

Preferably, the stabilizer T according to the present invention is of formula F1:

[Chem 3]

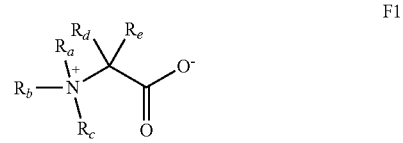

F1 in which Ra, Rb, Rc are, independently of one another, a carbon chain comprising from 1 to 20 carbon atoms, saturated, unsaturated, or polyunsaturated. Ra, Rb, Rc are in particular selected independently from the group consisting of alkane, alkene, and alkyne, and may equally be linear, branched or cyclic, comprising from 1 to 20 carbon atoms.

According to one embodiment, at least one of the groups Ra, Rb, Rc denotes a methyl group and the other two groups among Ra, Rb, Rc denote independently a linear, branched, or cyclic alkyl, alkene or alkyne chain, comprising from 2 to 20 carbon atoms.

According to another embodiment, at least two of the groups Ra, Rb, Rc denote a methyl group $CH_3$ and the third denotes a linear, branched or cyclic alkyl, alkene or alkyne chain comprising from 2 to 20 carbon atoms.

According to another embodiment, the three groups Ra, Rb, Rc each denote a methyl group $CH_3$ or ethyl $C_2H_5$, preferably methyl.

In the formula F1 of the stabilizer T, the groups Rd and Re denote, independently of one another, a hydrogen atom or a carbon chain comprising from 1 to 20 carbon atoms, saturated, unsaturated, or polyunsaturated. Rd and Re are in particular selected independently of one another from the group consisting of a hydrogen atom, an alkane, an alkene, and an alkyne, and each may equally be linear, branched or cyclic, comprising from 1 to 20 carbon atoms.

According to one embodiment, one of the two groups Rd and Re is a hydrogen atom.

According to another embodiment, one of the two groups Rd and Re is a hydrogen atom and the other is a linear, branched, or cyclic alkyl, alkene or alkyne group, comprising from 3 to 18 carbon atoms, preferably from 4 to 10 carbon atoms.

According to one embodiment, one or more, preferably just one, of the groups Ra, Rb and Rc denote a linear, branched or cyclic alkyl, alkene or alkyne chain comprising from 2 to 20 carbon atoms, the other of the groups Ra, Rb and Rc being methyl, or ethyl groups, and/or one of the two group Rd and Re denotes a hydrogen atom and the other denotes a linear, branched or cyclic alkyl, alkene or alkyne chain comprising from 2 to 20 carbon atoms, preferably between 3 and 18 carbon atoms or between 4 and 10 carbon atoms.

According to one embodiment, one or more, preferably just one, of the groups Ra, Rb and Rc denote a linear, branched or cyclic alkyl, alkene or alkyne chain comprising from 2 to 20 carbon atoms, the other of the groups Ra, Rb and Rc being methyl groups, and the two groups Rd and Re each denote a hydrogen atom.

According to another embodiment, the three groups Ra, Rb and Rc each denote a methyl or ethyl group, one of the two group Rd and Re denotes a linear, branched or cyclic alkyl, alkene or alkyne chain comprising from 2 to 20 carbon atoms, preferably between 3 and 18 carbon atoms, or between 4 and 10 carbon atoms, the other one of the two groups Rd and Re being a hydrogen atom.

The groups Ra, Rb, Rc, Rd and Re may be, independently, unsubstituted, or substituted with one or more halogens, in particular with one or more fluorine atoms. The term "unsubstituted" denotes the corresponding groups containing exclusively carbon atoms and hydrogen. The term "substituted" denotes the corresponding groups in which one or more of the hydrogen atoms are replaced with said substituents. One or more of the groups Ra, Rb, Rc, Rd and Re may be fully substituted, in particular with fluorine atoms. According to one embodiment, at least one of the groups Ra, Rb, Rc, Rd and Re is monofluorinated, or perfluorinated.

According to one embodiment, a single stabilizer T is added to the solution S.

According to an alternative embodiment, two or more than two different stabilizers T are added to the solution S. It is to be understood that each of the additives T added to the solution correspond to formula F1 described above.

According to one embodiment, at least one of the groups Ra, Rb, Rc, Rd, and Re denotes a carbon chain of the pelargonyl type with 9 carbon atoms, capric with 10 carbon atoms, lauryl with 12 carbon atoms, myristyl with 14 carbon atoms, palmityl with 16 carbon atoms and stearyl with 18 carbon atoms, the others of the groups Ra, Rb and Rc each being a methyl or ethyl group and the others of the groups Rd and Re being a hydrogen atom.

According to one embodiment, the stabilizer T is lauryl betaine. Preferably, the stabilizer T has the following formula:

[Chem 4]

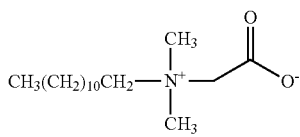

According to another embodiment, the stabilizer T is a compound of formula F1', corresponding to formula F1 in which at least one of the groups Ra, Rb and Rc represents a perfluorinated alkane or a perfluorinated alkene, linear or branched comprising from 1 to 20 carbon atoms, preferably between 3 and 18 carbon atoms or between 4 and 10 carbon atoms, and the others of these groups, if applicable, as well as the groups Rd and Re, are as defined in one or other of the embodiments of the present description, or in which at least one of the groups Rd and Re represents a perfluorinated alkane or a perfluorinated alkene, linear or branched comprising from 1 to 20 carbon atoms, preferably between 3 and 18 carbon atoms or between 4 and 10 carbon atoms, and the other of these groups, if applicable, as well as the groups Ra, Rb and Rc, are as defined in one or other of the embodiments of the present description.

The stabilizer is for example of the Capstone FS® type.

The solutions according to the present description may further comprise one or more inorganic salts of type XY, where X denotes a cation and Y denotes an anion. In these inorganic salts, X preferably denotes a cation selected from potassium $K^+$, sodium $Na^+$ and ammonium $NH_3^+$. In these inorganic salts, Y preferably denotes an anion selected from chlorine, iodine, bromine, fluorine. According to an advantageous embodiment, an inorganic salt such as KBr or KCl may be included in the solutions at a concentration between about 3 millimoles and about 50 millimoles per liter, or of the order of 5 to 20 millimoles per liter. The inorganic salts are selected so as to speed up the deposition of silver without adversely affecting the quality of the deposit or the stability of the bath. Addition of these salts is particularly advantageous for compensating any slowing of deposition due to the presence of an additive such as the stabilizer T.

According to a specific embodiment, the solutions comprise the combination of a fluorinated stabilizer T such as a component of formula F1' or a mixture of components of formula F1' with an inorganic salt of type XY described above.

The present invention also covers a method of chemical deposition on a surface P from a solution of metal salt M. FIG. 1 shows schematically the essential steps of the chemical deposition according to the present invention. In a first step E1, a solution S is prepared, which comprises at least one metal salt M and at least one reducing agent R. The solution S further comprises at least one stabilizer T for keeping the solution S homogeneous for at least 24 hours, preferably several days, or even more than a week. Depending on the stabilizers T selected and other parameters such as temperature and pH, the solution S may be stable for several weeks. Preferably, the metal salt or salts M, the reducing agent R and the stabilizing element or elements T are those described above. Other additives may optionally be included, in particular for maintaining the pH of the solution at a predetermined value. The components may be dissolved one at a time in water to form the solution S. Alternatively, the components may be dissolved individually in water so as to form intermediate solutions, which are then combined to give the solution S.

The solution S is stored in an open container so as to form a bath. The size of the container is preferably adapted to the dimensions of the surface P to be coated.

A second step of metallization E2 comprises immersion of a surface P to be metallized in the bath of solutions S. Immersion may be maintained for a variable time as a function of the desired thickness of the metallized layer C. In particular, immersion may last for some minutes to several hours, and is typically maintained for about 1 hour to 3 hours. The thickness of the metallized layer C that is deposited on the surface P during the first hour is preferably greater than 3 micrometers, preferably greater than 5 micrometers. The thickness of the metallic layer may be between 3 and 8 micrometers starting from the first hour. Alternatively or in addition, the final thickness of the metallized layer C is between about 3 and 12 micrometers.

The temperature of the bath may be controlled during the metallization step E2. It may for example be kept constant at a value between about 30° C. and more than 80° C. Other parameters such as the pH may be controlled or adjusted. When the immersion time is judged to be sufficient, or when the required thickness of the metallized layer C is reached, the surface P is withdrawn from the bath.

The metallization step E2 may be repeated several times with other surfaces P to be coated. The method according to the present invention makes it possible in this case to use the chemical deposition bath for a time of at least two days, preferably for a time of a week at most.

Several surfaces P may be immersed in the bath simultaneously. The surfaces P to be coated may be immersed and kept static in the bath for a predetermined time before being withdrawn. Alternatively, they may be conveyed through the bath continuously so as to stay there for a sufficient time to obtain the required metallized coating layer C.

The metallization step E2 may further comprise a step of monitoring the thickness or quality of the coating layer obtained, so as to evaluate the performance of the solution S. When the quality of the deposit degrades beyond a certain point, or when the thickness of the deposit no longer corresponds to a predetermined range of values, it may be decided to replace solution S with a new solution S according to step E1. Alternatively, the residence times of the surfaces P to be coated may be prolonged.

The term "stable" means in particular that the metal salts M remain in solution and do not precipitate, or not significantly, and that the reaction of reduction of the metal salt M by the reducing agent R does not occur or not significantly, so that a metal deposit can be made on a surface. The duration of stability of a solution comprising all the components necessary for chemical deposition of the metal salt M may for example be determined by immersing a surface to be metallized therein at increasing times after its preparation. When the speed or quality of metal deposition falls below a predetermined threshold, the solution S is considered to be degraded. Its duration of stability will correspond to the time when it is still possible to deposit a metallic coating on a surface P at an acceptable rate and a corresponding quality.

Examples of compositions are presented in Table 1 below. The volumes prepared are 300 mL. Deposition of the silver salt is carried out in all cases at a temperature of 50° C. and at pH of the order of 9.4. The rate of deposition of the coating on a surface is determined for the first hour by measuring the thickness of the deposit. The reference solution S0 comprises a silver salt as metallization agent and a cobalt salt as reducing agent. The solutions S1, S2, S3 and S4 contain the same base components as the reference solution S0 in the same proportions, and in addition contain at least one surfactant such as those described above.

The stability of the solutions tested demonstrates the positive effect of the surfactants used relative to the reference solution.

TABLE 1

| Components | concentration |
|---|---|
| Reference S0 | Stability: 1-3 h |
| | Deposition rate: 4.4 +/− 0.8 µm the first hour |
| $AgNO_3$ | 0.04M |
| $CoSO_4\text{-}7H_2O$ | 0.1M |
| $NH_3$aq. | 3.45M |
| $SO_4(NH_4)_2$ | 0.5M |
| | concentration |
| Solution S1 | Stability: several days |
| | Deposition rate: 3.4 +/− 0.4 µm the first hour |
| $AgNO_3$ | 0.04M |
| $CoSO_4\text{-}7H_2O$ | 0.1M |
| $NH_3$aq. | 3.45M |
| $SO_4(NH_4)_2$ | 0.5M |
| Capstone FS50 | 1 g/L |
| Solution S2 | Stability: Several days |
| | deposition rate: 3.8 +/− 0.4 µm The first hour |
| $AgNO_3$ | 0.04M |
| $CoSO_4\text{-}7H_2O$ | 0.1M |
| $NH_3$aq. | 3.45M |
| $SO_4(NH_4)_2$ | 0.5M |
| Lauryl betaine | 1 g/L |
| Solution S3 | Stability: Several days |
| | deposition rate: 5.6 µm the first hour |
| $AgNO_3$ | 0.04M |
| $CoSO_4\text{-}7H_2O$ | 0.1M |
| $NH_3$aq. | 3.45M |
| $SO_4(NH_4)_2$ | 0.5M |
| Capstone FS50 | 1 g/L |
| Diiodotyrosine (DIT) | $4.10^{-5}$M |

TABLE 1-continued

| Components | concentration |
|---|---|
| Solution S4 | Stability: Several days |
| | Deposition rate: 5.8 µm the first hour |
| $AgNO_3$ | 0.04M |
| $CoSO_4\text{-}7H_2O$ | 0.1M |
| $NH_3$aq. | 3.45M |
| $SO_4(NH_4)_2$ | 0.5M |
| Laurylbetaine | 1 g/L |
| Diiodotyrosine (DIT) | $4.10^{-5}$M |
| Solution S5 | Stability: Several days |
| | Deposition rate: de 1.5 à 7 µm the first hour |
| $AgNO_3$ | 0.04M |
| $CoSO_4\text{-}7H_2O$ | 0.1M |
| $NH_3$aq. | 3.45M |
| $SO_4(NH_4)_2$ | 0.5M |
| Capstone FS50 | between 0.25 g/L and 2 g/L |
| KCl | between 0.5 mM and 20 mM |

The surface P on which metal deposition is carried out denotes the surface of any item to be treated, regardless of its material or its shape. The item may be for example an item made of plastic or of polymer, or of metal or of metal alloy. The item may be of homogeneous composition or conversely may comprise a mixture or a combination of several materials. It may for example comprise an additional layer of a material different than its main composition. The item to be treated may thus denote an item made of polymer coated with a metallic layer. The surface P then denotes the metallic layer covering the item.

The methods of manufacture of the item and/or of its surface P are not very important in the context of the present description. The item may for example be the result of a process of molding, of machining or of 3D printing. The metallized layer, if applicable, may result from an electrolytic or non-electrolytic method. The metallic layer representing the surface P may for example comprise gold, palladium, nickel-phosphorus, nickel-boron, platinum. A metal layer or several metal layers may improve the adherence of the deposit described here, protect the item against corrosion, improve the surface quality, in particular in terms of roughness. The item itself may be of metal, such as aluminum.

According to an embodiment example, the item to be treated is involved in the emission or reception of radio frequencies. The effective electric conductivity, which depends on the state of its surface and the electric conductivity of the metal deposited, must be as high as possible. It is important that the deposit made according to the present description on the surface P is homogeneous and reproducible both in terms of thickness and of quality.

Other surfactants of the betaine type may be used, either alone or in combination with other elements. Certain surfactants may, however, have negative effects on the stability of the autocatalytic solutions or on the quality of the silver deposits, which may be porous or uneven, when they are present in certain ranges of concentration. Preferably, with regard to solutions of silver and cobalt salts, the surfactants such as sodium dodecyl sulfate (SDS), cetyltrimethylammonium bromide (CTAB), perfluorooctane sulfonic acid potassium salt (PFOSP), and perfluorooctanoic acid (PFOA) may be excluded from the compositions, or limited to certain concentration ranges. Preferably, commercial products such as silwet L77®, triton x100®, Pluronic F-127® may also be excluded from the compositions or limited to certain concentration ranges.

What is claimed is:

1. A solution(S) comprising at least one metal salt (M), a reducing agent (R) for reducing the metal salt (M), and a stabilizer (T), wherein the stabilizer (T) is a zwitterionic organic compound of formula (F1):

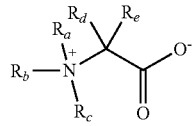

F1 in which the groups Ra, Rb, Rc denote, independently of one another, an alkane, an alkene, or an alkyne, being independently, linear, branched or cyclic and comprise from 1 to 20 carbon atoms, and where the groups Rd and Re denote, independently of one another, a hydrogen atom, or an alkane, an alkene, or an alkyne, being independently, linear, branched or cyclic and comprise from 1 to 20 carbon atoms,
- wherein the metal salt (M) comprises a silver salt combined with an organic or inorganic anion,
- wherein the reducing agent (R) consists of a cobalt salt, combined with an organic or inorganic anion, and
- wherein at least the metal salt (M) and the reducing agent (R) are dissolved in a solution that forms a bath.

2. The solution as claimed in claim 1, in which the concentration of the reducing agent (R) is from 2 to 10 times greater than the concentration of the metal salt (M).

3. The solution as claimed in claim 1, in which, in formula F1, one or more of the groups Ra, Rb and Re denotes a linear, branched or cyclic alkyl, alkene or alkyne chain and comprises from 2 to 20 carbon atoms, the others of the groups Ra, Rb and Re being methyl or ethyl groups.

4. The solution as claimed in claim 1, in which in formula F1, one of the two group Rd and Re denotes a hydrogen atom and the other denotes a linear, branched or cyclic alkyl, alkene or alkyne chain comprising from 2 to 20 carbon atoms.

5. The solution as claimed in claim 1, in which the two groups Rd and Re are each hydrogen atoms.

6. The solution as claimed in claim 1, further comprising one or more amino acids.

7. The solution as claimed in claim 1, in which at least one of the groups Ra, Rb, Re, Rd, and Re is substituted with one or more halogens.

8. The solution as claimed in claim 1, the solution being selected from:

| Solution S1 | |
|---|---|
| AgNO$_3$ | 0.04M |
| CoSO$_4$—7H$_2$O | 0.1M |
| NH$_3$aq. | 3.45M |
| SO$_4$(NH$_4$)$_2$ | 0.5M |
| Capstone FS50 | 1 g/L |
| Solution S2 | |
| AgNO$_3$ | 0.04M |
| CoSO$_4$—7H$_2$O | 0.1M |
| NH$_3$aq. | 3.45M |
| SO$_4$(NH$_4$)$_2$ | 0.5M |
| Lauryl betaine | 1 g/L |
| Solution S3 | |
| AgNO$_3$ | 0.04M |
| CoSO$_4$—7H$_2$O | 0.1M |
| NH$_3$aq. | 3.45M |
| SO$_4$(NH$_4$)$_2$ | 0.5M |
| Capstone FS50 | 1 g/L |
| Diiodotyrosine (DIT) | 4.10$^{-5}$M |
| Solution S4 | |
| AgNO$_3$ | 0.04M |
| CoSO$_4$—7H$_2$O | 0.1M |
| NH$_3$aq. | 3.45M |
| SO$_4$(NH$_4$)$_2$ | 0.5M |
| Lauryl betaine | 1 g/L |
| Diiodotyrosine (DIT) | 4.10$^{-5}$M |
| Solution S5 | |
| AgNO$_3$ | 0.04M |
| CoSO$_4$—7H$_2$O | 0.1M |
| NH$_3$aq. | 3.45M |
| SO$_4$(NH$_4$)$_2$ | 0.5M |
| Capstone FS50 | Between 0.25 g/L and 2 g/L |
| KCl | Between 0.5 mM and 20 mM | wherein Capstone FS50 denotes the compounds carboxymethyldimethyl-3-[[(3,3,4,4,5,5,6,6,7,7,8,8,8-tridecafluorooctyl)sulphonyl]amino]propylammonium hydroxide.

9. The solution as claimed in claim 1, in which, in formula F1, only one of the groups Ra, Rb and Rc denotes a linear, branched or cyclic alkyl, alkene or alkyne chain and comprises from 2 to 20 carbon atoms, the others of the groups Ra, Rb and Rc being methyl or ethyl groups.

10. The solution as claimed in claim 1, in which in formula F1, one of the two group Rd and Re denotes a hydrogen atom and the other denotes a linear, branched or cyclic alkyl, alkene or alkyne chain comprising between 5 and 18 carbon atoms.

11. The solution as claimed in claim 1, in which at least one of the groups Ra, Rb, Rc, Rd, and Re is substituted with one or more fluorine atoms.

* * * * *